United States Patent

Butler

[15] 3,686,955
[45] Aug. 29, 1972

[54] OPTICAL WHEEL BALANCER

[72] Inventor: Louis L. Butler, 2731 28th Ave., Rock Island, Ill. 61201

[22] Filed: April 2, 1970

[21] Appl. No.: 25,000

[52] U.S. Cl. .................................................. 73/457
[51] Int. Cl. ............................................. G01m 1/28
[58] Field of Search .......... 73/457, 66, 460, 466, 467, 73/71.3, 459; 356/23, 25

[56] References Cited

UNITED STATES PATENTS

| | | | |
|---|---|---|---|
| 728,315 | 5/1903 | Snell | 73/467 |
| 2,869,372 | 1/1959 | Sihvonen | 73/460 |
| 1,877,713 | 9/1932 | Beck | 356/23 |
| 3,008,327 | 11/1961 | Hrebicek | 73/459 X |

FOREIGN PATENTS OR APPLICATIONS 888,755   9/1943   France ........................... 73/66

*Primary Examiner*—James J. Gill
*Attorney*—Henderson & Strom

[57] ABSTRACT

An apparatus for balancing a wheel mounted on a vehicle by visually observing its off-center movements upon rotation thereof. The apparatus includes an indicia applied to the wheel, a base supporting a housing, a variable strobe lamp connected to the housing and directed toward the indicia, an optical unit enclosed within the housing, the unit including a first lens focused upon the indicia and a second lens adapted to transmit the image of the indicia from the first lens to an observer, and an indicator disposed between the first and second lenses to relate to the observer the off-center movements of the rotating wheel and thereby indicate both the amount of weight required to balance the wheel and the location for the placement thereof. A bail and stylus pivotally connected to the housing may be included to form the indicia on the wheel.

Also an integral part of the invention is the method of optically balancing a wheel mounted on a vehicle including the steps of (1) suspending the wheel above the ground; (2) marking a reference point on the wheel; (3) rotating the wheel, (4) synchronizing a strobe lamp to conform to the speed of rotation of the wheel and thereby provide a motionless appearance to the reference and wheel; (5) observing the position of the reference when the wheel is at its lowest vertical position; (6) stopping the wheel and manually rotating the wheel to position the reference in substantially the same location as previously observed; and (7) applying appropriate counter-weights to the wheel.

10 Claims, 5 Drawing Figures

Patented Aug. 29, 1972

3,686,955

INVENTOR.
LOUIS L. BUTLER
BY Henderson & Strom
ATTORNEYS

OPTICAL WHEEL BALANCER

BACKGROUND OF THE INVENTION

This invention generally relates to wheel balancing apparatuses and more particularly to a wheel balancing apparatus adapted to balance a wheel mounted on a vehicle.

Sustained high speeds on modern, smooth highways have increased the demand for fine wheel balancing. The new performance, wide profile and radial ply tires require precise static and dynamic balance to eliminate troublesome vibrations of the vehicle.

The older type wheel balancing machines require the wheel and tire to be removed from the vehicle prior to balancing. This type of machine has the disadvantage of requiring the wheel to be removed and then remounted from the vehicle, necessitating additional time and labor.

The newer type of wheel balancing machines are adapted to balance the wheel while the wheel is mounted on the vehicle. One type of on-the-vehicle balancer includes a disc-like mechanism clamped to the wheel. The mechanism is operable to dispose weight at selective locations about the tire and thus to direct the placement by the operator of "permanent" weights to the location indicated, once the optimum location and amount of weight is determined. The disadvantages of this type of balancer are that a plurality of clamps are required to adapt the disc mechanism to the various sizes of conventional wheels, the possibility that the disc may be secured to the wheel "off-center" and result in an inaccurate balance, and the necessity of first removing the wheel cover prior to balancing and thereby creating the possibility of an unbalance when the cover is replaced.

Another type of on-the-vehicle balancer includes a strobe lamp synchronized to conform to the RPM's of the rotating wheel by a probe disposed under and in engagement with the A-frame of the vehicle. The disadvantages inherent with this type of balancer is the need for a probe, the inconvenience of adjusting the probe under the suspended wheel to engage the A-frame, and the inability to accurately adjust the strobe to conform to the RPM's of the wheel when the wheel is nearly in-balance.

The wheel balancing apparatus of this invention is adapted to overcome all of the hereinbefore known and described disadvantages in addition to providing a faster and more accurate method of balancing a wheel mounted on a vehicle.

SUMMARY OF THE INVENTION

An apparatus for balancing a rotatable wheel mounted on a vehicle, the wheel having an indicia applied thereto, the apparatus including a base; a housing connected to the base; a strobe lamp connected to the housing and directed toward the wheel indicia; and an optical unit enclosed within the housing and connected thereto, the unit including a first lens directed toward the indicia and a second lens spaced apart from the first lens and adapted to visually transmit an image of the indicia from the first lens to the operator, the unit further including a transparent indicator disposed between the first and second lenses adapted to superimpose the indicia image thereon and indicate the placement of the weight and the amount of weight required to be attached to the wheel to perfect a balance thereof. A bail and stylus unit may be pivotally connected to the housing to apply the indicia to the wheel.

Also an integral part of the invention is the novel method of balancing a wheel mounted on a vehicle comprising the steps of (1) suspending the wheel above the ground; (2) marking the wheel cover with a center mark, (3) spinning the wheel; (4) synchronizing a strobe lamp to conform the light flashes thereof to the wheel RPM's to provide a motionless appearance to the mark and wheel; (5) observing the direction the mark is pointing when it is in its lowest position; (6) stopping rotation of the wheel and manually rotating the wheel to direct the mark in the direction previously observed; and (8) attaching weight to the wheel accordingly.

It is an object of this invention to provide an improved wheel balancing apparatus for balancing a vehicle mounted wheel.

It is another object of this invention to provide a wheel balancing apparatus capable of balancing the entire wheel, tire, wheel cover and brake drum assembly in a single operation.

It is yet another object of this invention to provide a wheel balancing apparatus capable of optically magnifying a reference mark applied to a wheel and superimposing the mark on an indicator to indicate to an observer the amount of weight and the necessary placement thereof to the wheel to accurately balance the wheel.

It is still another object of this invention to provide a wheel balancing apparatus capable of accurately indicating the out-of-balance movements of a rotating wheel mounted on a vehicle by means of a strobe lamp selectively operable to provide a motionless appearance to the rotating wheel.

It is a further object of this invention to provide a novel method of balancing a wheel mounted on a vehicle without the need to remove the wheel.

Another object of this invention is to provide a wheel balancing apparatus that is compact, simple to operate, economical to manufacture, and rugged in construction.

These objects and other features and advantages of the wheel balancing apparatus of this invention will become readily apparent upon reference to the following description when taken in conjunction with the accompanying drawings.

DESCRIPTION OF THE PREFERRED EMBODIMENT

Figure 4:
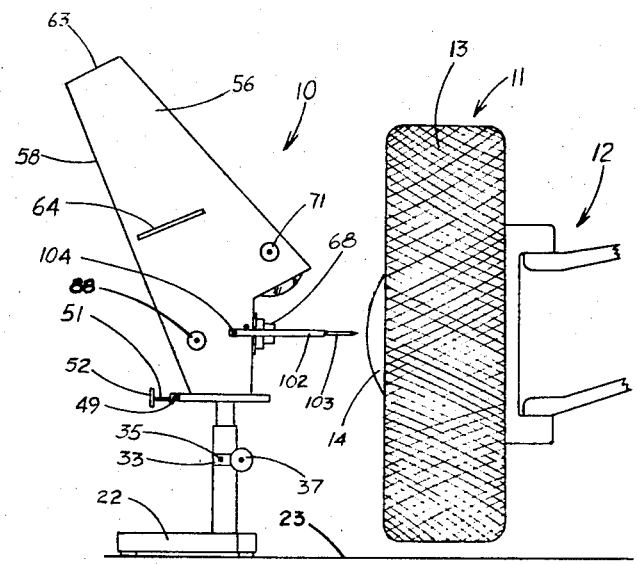
FIG. 4 is a side elevational view showing the device in working relationship to a vehicle mounted wheel.

Referring now to the drawings and particularly to FIG. 4, the wheel balancing apparatus of this invention is indicated generally by the numeral 10. The balancing apparatus 10 is shown relative to a conventional wheel assembly 11 rotatably mounted to a vehicle, only a portion 12 of which is illustrated. The wheel assembly 11 generally includes a brake drum (not shown), a wheel (not shown), a tire 13, and a wheel cover 14. An indicia 16 (FIG. 5), is applied to the wheel assembly 11 preferably near the center thereof, to serve as a reference point, as hereinafter described.

Figure 1:
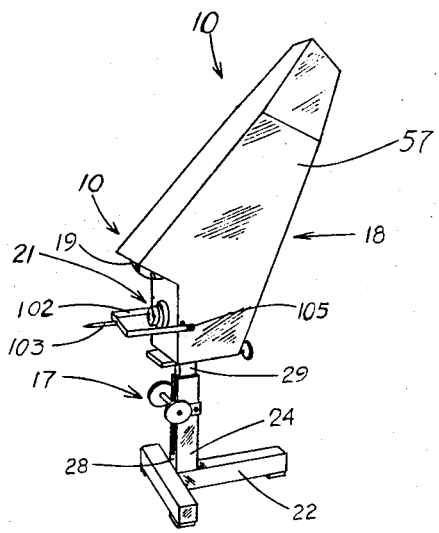
FIG. 1 is a perspective view of the optical wheel balancing apparatus of this invention.

The wheel balancing apparatus 10 (FIG. 1) generally includes a base 17 connected to and supporting a housing 18, a strobe tube 19 is connected to the housing 18 and directed toward the wheel assembly 11, and an observation unit 21 connected to and enclosed within the housing 18 to visually observe the vertical movement of the indicia 16 in the course of the balancing operation.

The base 17 (FIGS. 1–4) includes a generally horizontal member 22 adapted to engage the floor 23 or ground, and support the wheel balancing apparatus 10 thereon. A vertical sleeve 24 is connected, as by welding, at the lower end 26 thereof, to the horizontal member 22. The sleeve 24 is provided with a slot 27 formed in one side 28 thereof, the slot 27 extending substantially the length thereof.

Slidably mounted within the sleeve 24 is an upright 29 having an elongated member 31, including a plurality of teeth 32 extending therefrom. The toothed member 31 is aligned within the slot 27 for slidable movement therein.

A pair of spaced apart brackets 33 and 34 are connected with bolts 35, or the like, to the sleeve 24. A spur gear 36 is rotatably connected to the brackets 33 and 34 to mesh the teeth 32 of the member MEMBER 31 with the spur gear 36. A pair of manually operable knobs 37 and 38, or the like, are connected to the gear 36 and project laterally of the brackets 33 and 34. Thus it can be seen that rotation of the knobs 37 and 38 results in a rotation of the spur gear 36 and a corresponding vertical movement of the upright 29 by the interaction of the spur gear 36 and the teeth 32 of the elongated member 31.

Figure 2:
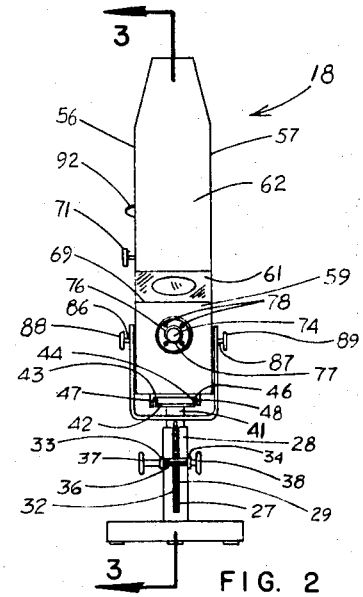
FIG. 2 is a front elevational view.
Figure 3:
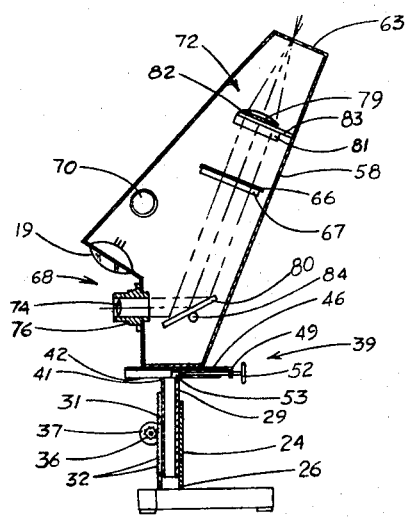
FIG. 3 is a cross-sectional view as taken along the line 3–3 of FIG. 2.

The base 17 further includes a horizontal adjusting unit 39 (FIGS. 2 and 3). The unit 39 includes a stationary, horizontal plate 42 connected to the upper end 41 of the upright 29. The plate 42 includes a pair of oppositely disposed, upwardly flanged sides 43 and 44 forming runners for slidably mounting a movable plate 46 thereon. The movable plate 46 includes a pair of downwardly flanged sides 47 and 48 overlapping the runners 43 and 44 and a downwardly flanged end 49 disposed rearwardly thereof, relative to the wheel assembly 11 (FIG. 4). The end 49 is provided with an aperture (not shown) formed therein.

An adjusting bolt 51 having a serrated head 52 or knob is threaded through the aperture formed in the end 49 and is rotatably connected to an anchor bracket 53 fixedly secured to the stationary plate 42. Turning of the adjusting bolt 51 causes the end 49 to be moved appropriately along the longitudinal axis of the bolt 51 to provide fore-and-aft movement of the movable plate 46 upon the runners 43 and 44.

The housing 18 is connected to the movable plate 46 and is generally defined by a pair of spaced vertical sides 56 and 57 interconnected by a back plate 58, and front plates 59, 61 and 62. Enclosing the top 63 of the housing 18 is a glass covering (not shown), preferably of the non-glare variety. A slot 64 is formed in one side 56 of the housing 18 for insertion of an indicator element 66 (FIG. 5), as hereinafter described. A pair of oppositely disposed mounting brackets, only 67 being shown, are connected to the inside surfaces of sides 56 and 57 to support the indicator element 66.

Front plate 59 is disposed in a vertical plane and is provided with an aperture (not shown) to receive and mount lens unit 68, as hereinafter described. Front plate 61 is connected to the top edge 69 of the vertical plate 59 and extends upwardly and outwardly therefrom. The inclined plate 61 is provided with an aperture (not shown) for receiving the strobe tube 19, as hereinafter described.

The strobe tube 19 (FIGS. 2 and 3) is operably connected to a socket (not shown) connected to the housing 18 and includes a potentiometer 70 connected to the side 56 of the housing 18. The strobe tube 19 is conventional and is adapted to direct rapidly flashing light to the wheel indicia 16, as hereinafter described. The potentiometer 70 is operably connected to the strobe tube 19 and includes a control knob 71 disposed laterally of housing side 56. The control knob 71 is operable to regulate the potentiometer 70 and thereby selectively adjust the light flashes to conform to the revolutions per minute, hereinafter referred to as RPM's, of the wheel assembly 11 and thereby visually simulate a motionless appearance to the wheel assembly 11.

The observation unit 21 generally includes a pair of spaced apart optical units 68 and 72 (FIGS. 3 and 5) adapted to magnify the indicia 16, and an indicator element 66 to visually observe the relative movement of the indicia 16 upon rotation of the wheel assembly 11. The lower lens unit 68 includes a lens 74 mounted within a cell 76 and secured therein by a retainer 77. The cell 76 traverses vertical panel 59 through the aperture (not shown) formed therein and is connected to the panel 59 by appropriate fasteners 78.

The upper lens units 72 includes a lens 79 adapted to optically transmit the image of the indicia 16 from the first lens 74 to the operator. The lens 79 is mounted within cell 81 and is secured therein by a retainer 82. The cell 81 is connected to a panel 83 having an aperture (not shown) formed therein, which panel 83 is connected, as by welding, to the sides 56 and 57 of the housing 18.

A mirror 80 is disposed rearwardly of the lower lens unit 68 and is pivotally connected to sides 56 and 57 of the housing 18 by a rod 84 secured to the mirror 80 and extending through apertures (not shown) formed in sides 56 and 57. The extended rod ends 86 and 87 are provided with a pair of caps 88 and 89 respectively to manually tilt the mirror 80 and thereby reflect the image of the indicia 16 from the lower lens 74 to the upper lens 79.

It should be remembered that the hereinbefore described optical arrangement is not considered critical to the operation of the invention but it is rather the preferred arrangement to facilitate comfort and convenience for the operator. It should be recognized that arranging the lens units 68 and 72 in the same axis for example, would likewise suffice to give the same effect.

The indicator element 66 (FIG. 5) includes a transparent plate 91 having a tab 92 provided at one end thereof for purposes hereinafter described. An indicating member 93 having a plurality of numerals 94 formed adjacent the periphery thereof is inscribed in the plate 91. For the sake of simplicity, the preferred indicating member 93 is circular and numerals 94 are illustrated to resemble the face of a clock. A plurality of horizontal lines 96, 97 and 98 are also inscribed in the plate 91 within the periphery of the indicating member 93.

The indicator element 66 is adapted to be inserted in the housing 18 through slot 64 in the side 56 thereof with the tab 92 extending laterally of the side 56 to serve as a handle to grip the element 66 for the manual insertion and removal. Thus when seated within the housing 18, the element 66 is disposed between the two lens units 68 and 72 with the indicating member 93 disposed directly in the line of vision between the mirror 80 and the upper lens unit 72. The image of the indicia 16 is transmitted through the plate 91 and is superimposed on the indicating member 93 thereof, the purpose of which will be hereinafter described.

Figure 5:
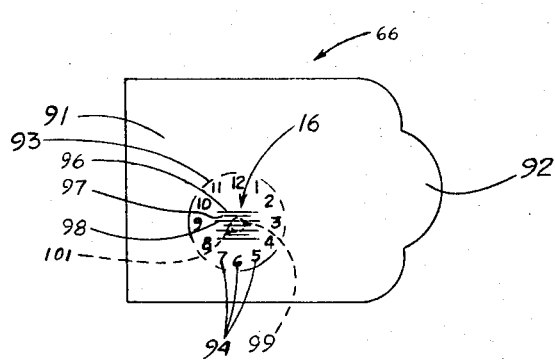
FIG. 5 is a plan view of the indicator member of the invention showing the indicia superimposed thereon in broken lines.

The indicia 16 is preferably applied to the approximate center of the wheel cover 14. This may be accomplished by simply placing the tip of a stylus near the center of the cover 14 and manually rotating the wheel assembly 11 to provide a circular mark 99 (FIG. 5). In this way, the center of the cover 14 would be identical to the center of the inscribed circular mark 99. An arrow 101, or the like, is arbitrarily applied immediately outside of the circular mark 99 to serve as a reference point, for purposes hereinafter described.

In practice, it has been found preferable to apply a relatively small piece of tape (not shown) to the wheel cover 14 at the approximate center thereof. A bail member 102 (FIGS. 1 and 4) having a stylus 103 connected thereto is pivotally connected to the sides 56 and 57 by screw fasteners 104 and 105 respectively, or the like. With the apparatus 10 positioned normal to the wheel assembly 11 and adjacent thereto, the bail member 102 is raised to engage the stylus 103 with the tape (not shown) and the wheel assembly 11 is manually rotated as hereinbefore described. Upon applying the circular mark 99 to the tape, the bail member 102 is lowered to disengage the tape and the arrow 101 is arbitrarily applied by another stylus.

In operation, the vehicle is raised by a conventional jack, or the like, to suspend the wheel assembly 11 above the floor 23. The wheel balancing apparatus 10 is then positioned adjacent to the wheel assembly 11 to be balanced and disposed substantially normal thereto. The indicia 16 is then applied to the wheel cover 14 to indicate the center thereof, and the height of the first lens unit 68, relative to the floor 23 is adjusted by appropriately rotating the spur gear 36 whereby the lens unit 68 extend substantially coaxially to the center or spindle of the wheel assembly 11. The horizontal adjusting unit 39 is then appropriately operated to clearly focus the indicia 16 for the observer looking into the top 63 of the housing 18.

Once the wheel balancing apparatus 10 is properly positioned and adjusted to conform to the vision of the individual operator, the wheel assembly 11 is mechanically rotated by a conventional wheel spinner (not shown) and the strobe tube 19 is adjusted by the control knob 71 of the potentiometer 70 to synchronize the light flashes therefrom to the RPM's of the wheel assembly 11 and thereby provide the rotating wheel assembly 11 and indicia 16 with a motionless appearance.

The indicia 16 is observed on the indicating member 93 of the indicator element 66. The position of the indicia 16 relative to the horizontal lines 96–98 inscribed thereon will indicate the amount of weight required, i.e., each line may represent one-half ounce. Different indicators 66 having different spacings between the horizontal lines 96–98 are supplied according to the size of the tires to be balanced or the type of suspension that supports the wheels. Commonly, most of the movement caused by unbalance is transmitted no farther than the ball-joint suspensions that have a small amount of free movement or spring-loaded movement when the wheels are raised, and therefore, the characteristics of the remainder of the spring suspensions may not be significant. As a result, the spacing between the horizontal lines 96–98 on an indicator 66 is satisfactory for indicating the approximate amount of weights to be added to the wheels on many models of automobiles. The direction that the arrow 101 of the indicia 16 is pointing when the indicia 16 is observed at its lowest position on the indicating member 93 is noted. The wheel assembly 11 is then stopped and manually rotated to a position where the arrow 101 again points in the same direction as previously observed. The hereinbefore noted amount of wheel weight is attached to the rear side of the wheel (not shown) forwardly of the spindle. For example, if the right front wheel assembly 11 of the vehicle is being balanced, and the arrow 101 of the indicia 16 is observed as directed toward 8 o'clock and the indicia 16 has traversed six lines 96–98 when it has reached it lowest position; the stopped wheel assembly 11 would be mechanically rotated to again position the arrow 101 at 8 o'clock. The six lines would indicate that three ounces of weight would be required to counterbalance the wheel assembly 11 and the weight would be attached to the rear side of the wheel at an imaginary 3 o'clock position.

According to well-known principles, the change in position of a rotating body by adding a weight near its circumference is determined vectorially. When the rate of rotation is high, the change in direction of the displacement of the entire body is nearly 90° from the direction of the radius through the position where the weight has been added. Since various mechanical characteristics such as the type of mounting of the wheels on an automobile also have an effect on the direction of the displacement and make the exact direction difficult to compute mathematically, the correct placement of the weights has been determined empirically. Presently, while balancing wheels that are still mounted on an automobile, conventional spinners rotate the wheels at a speed corresponding to a road speed of approximately 80 miles per hour. At these speeds, the correct placement of the weight according to the present method has been determined empirically to be in front of the spindles when the wheels are conveniently oriented to have maximum displacement in a downward direction. In more detail, while a wheel is being rotated at this speed, the control knob 71 of the potentiometer 70 is adjusted until the indicia 16 does not rotate and is oriented so that maximum displacement is in a downward direction as shown on the scale provided by the horizontal lines 96–98 on the indicator element 66. The rotative position of the wheel as shown by the arrow 101 of the indicia is then observed, and after the wheel is stopped and rotated manually to that position where it was observed while it was being spun, the required weight is attached to the wheel in front of its spindle.

In practice, it has been found that two weights and two positions are required to accurately balance the wheel assembly 11. Therefore, subsequent to the attachment of the first weight, the wheel assembly 11 is again mechanically rotated and similar observations are noted. The wheel assembly 11 is again stopped and the appropriate weight is again attached to the wheel. However, the second weight is preferably attached to the front side of the wheel rather than to the rear side thereof.

Thus it may be seen that a novel wheel balancing apparatus 10 and method of balancing a wheel assembly 11 mounted on a vehicle has been hereinbefore described that assures quick and accurate balancing of the entire wheel assembly 11. The wheel balancing apparatus 10 is provided in a compact unit to facilitate portability, storage and use.

Although a preferred embodiment of the wheel balancing apparatus of this invention and a method to optically balance an entire wheel assembly has hereinbefore been fully described, it is to be remembered that various modifications can be made thereto without departing from the invention as hereinbefore defined.

I claim:

1. Apparatus for observing vibration of a mounted wheel while it is being spun comprising:
   strobing light means directed to said wheel to illuminate an indicia applied to the center thereof, said indicia having an arrow to indicate the rotative position of said wheel, said strobing light means including strobing light control means adjustable in frequency to synchronize said strobing light means with the rotation of the wheel to stop visually the rotation of said indicia,
   a first lens,
   a reference indicator,
   means for supporting said first lens and said reference indicator spaced apart at respective predetermined distances from said indicia where it is to be observed during rotation of said wheel to project an image of said indicia on said reference indicator,
   said strobing light control means being further adjustable in phase to show maximum amplitude of vibration of said projected image of said indicia in a predetermined direction on said reference indicator to indicate maximum radial departure of said wheel in a predetermined direction from its balanced center position at a particular instant during each revolution of said wheel and the direction of said arrow of the image of said indicia showing simultaneously the rotative position of said wheel at said particular instant.

2. An apparatus for balancing a mounted wheel as claimed in claim 1 wherein said means for supporting said first lens and said reference indicator is a housing, said strobing light means includes a strobe light and said control means mounted to said housing.

3. An apparatus for balancing a mounted wheel as defined in claim 2 wherein a second lens is mounted in said housing and spaced apart from said first lens and adapted to visually transmit the image of the indicia from said lens to the operator.

4. An apparatus for balancing a mounted wheel as defined in claim 3 wherein said indicator includes a transparent member disposed between said first lens and said second lens, said transparent member including an indicating member inscribed thereon, the image of the indicia visually appearing upon said indicating member.

5. An apparatus for balancing a mounted wheel as defined in claim 4 wherein said transparent member further includes a plurality of horizontal lines inscribed upon said indicating member, whereby the position of the indicia relative to said lines indicates the amount of weight required to balance the wheel.

6. An apparatus for balancing a mounted wheel as defined in claim 5 wherein said housing has a base including means for vertically adjusting the height of said housing relative to the ground, said mounted wheel being a vehicle wheel raised a short distance above ground to facilitate its rotation.

7. An apparatus for balancing a mounted wheel as defined in claim 6 wherein said base further includes means for adjusting the fore-and-aft position of said housing relative to the wheel.

8. An apparatus for balancing a mounted wheel as defined in claim 7 wherein said apparatus further comprises a bail pivotally connected to said housing and a stylus connected to said bail, said bail being rotatable outwardly to engage said stylus and the wheel at a point near the center thereof to inscribe at least a portion of said indicia thereon, said portion being a circle inscribed concentric with said wheel as said wheel is slowly rotated.

9. The method of optically balancing a mounted wheel comprising:
   1 suspending the wheel above the ground;
   2. marking a reference character with an arrow on the wheel;
   30 rotating the wheel mechanically;
   4. synchronizing a strobe lamp directed toward the wheel to conform to the speed of rotation of the wheel to provide a motionless appearance to the wheel and said reference character where said reference character appears to be in its farthest position from the center of the wheel in a predetermined radial direction;
   5. observing visually the direction said arrow is aimed when said reference character is at its farthest position from the center of the wheel in said predetermined radial direction;
   6. stopping the wheel and manually rotating the wheel to a position where said arrow is pointed in the same direction as observed in step 5;
   7. applying weight to the rear side of the wheel at a point 90° in advance of said predetermined radial direction;
   8. repeating steps 4 through 6; and
   9. applying weight to the front side of the wheel at a point 90° in advance of said predetermined radial direction.

10. The method of optically balancing a mounted wheel as claimed in claim 9 wherein said farthest position from the center of the wheel in a predetermined radial direction is the lowest vertical position below the center of the wheel and said point 90° in advance of said predetermined radial direction is forwardly of the spindle of the wheel.

* * * * *